(12) United States Patent
Nagata et al.

(10) Patent No.: US 6,477,842 B1
(45) Date of Patent: Nov. 12, 2002

(54) GAS TURBINE CONTROLLER OF SINGLE-SHAFT COMBINED CYCLE POWER GENERATING PLANT AND GAS TURBINE OUTPUT CALCULATING METHOD

(75) Inventors: Shouichi Nagata, Takasago; Hiroya Komiyama, Yokohama, both of (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/890,188

(22) PCT Filed: Dec. 20, 2000

(86) PCT No.: PCT/JP00/09027

§ 371 (c)(1),
(2), (4) Date: Jul. 30, 2001

(87) PCT Pub. No.: WO01/46567

PCT Pub. Date: Jun. 28, 2001

(30) Foreign Application Priority Data

Dec. 21, 1999 (JP) ............................................ 11-362879

(51) Int. Cl.[7] ................................................ F02C 6/18
(52) U.S. Cl. ..................................... 60/772; 60/39.182
(58) Field of Search ...................... 60/772, 773, 39.182, 60/39.3; 122/7 R, 7 B

(56) References Cited

U.S. PATENT DOCUMENTS

| | | | | |
|---|---|---|---|---|
| 4,081,956 A | * | 4/1978 | Baker et al. | 60/39.182 |
| 4,353,204 A | * | 10/1982 | Arakawa | 60/39.182 |
| 4,445,325 A | * | 5/1984 | Tratz et al. | 60/39.182 |
| 5,630,314 A | * | 5/1997 | Kojima et al. | 60/39.182 |

FOREIGN PATENT DOCUMENTS

| | | |
|---|---|---|
| JP | 55-84805 | 6/1980 |
| JP | 56-38503 | 4/1981 |
| JP | 60-17695 | 1/1985 |
| JP | 60-206907 | 10/1985 |
| JP | 8-270407 | 10/1996 |
| JP | 11-336509 | 12/1999 |

* cited by examiner

Primary Examiner—Ted Kim
(74) Attorney, Agent, or Firm—Wenderoth, Lind & Ponack, L.L.P.

(57) ABSTRACT

A gas turbine control apparatus for a single-shaft type combined cycle power plant is provided by which gas turbine output is accurately computed during a circulating water reversing wash operation. Vacuum down amount is computed from a generator output signal (31) immediately before the mentioned reversing wash operation and is corrected by being multiplied by a valve opening correction factor computed from a condenser reversing valve opening signal (41) and a sea water temperature correction factor computed from a condenser reversing valve inlet sea water temperature signal (47). A condenser vacuum at the time of the reversing wash operation is computed by the corrected vacuum down amount being subtracted therefrom. A vacuum correction factor is computed based on the computed condenser vacuum. A reference steam turbine output is computed based on a post-intercept valve steam pressure signal (34) and a steam turbine output signal (54) is computed by multiplying the reference steam turbine output by the vacuum correction factor. A gas turbine output signal (55) is computed by subtracting the steam turbine output signal (54) from the generator output signal (31).

20 Claims, 6 Drawing Sheets

GAS TURBINE CONTROLLER OF SINGLE-SHAFT COMBINED CYCLE POWER GENERATING PLANT AND GAS TURBINE OUTPUT CALCULATING METHOD

BACKGROUND OF THE INVENTION

1. Field of the Invention

The present invention relates to a gas turbine control apparatus and gas turbine output computing method for a single-shaft type combined cycle power plant that comprises a gas turbine, steam turbine and generator, respective rotational shafts of which are connected together to form a single shaft, and a condenser for condensing exhaust steam of the steam turbine.

2. Description of the Prior Art

As a gas turbine control apparatus used for the mentioned single-shaft type combined cycle power plant, such one as disclosed in the Japanese laid-open patent application No. Hei 8-270407, for example, is known. The gas turbine control apparatus disclosed there comprises a vacuum correction factor computing portion for computing a vacuum correction factor based on a condenser vacuum; a steam turbine output computing portion for computing a steam turbine output corrected by multiplying a reference steam turbine output that is computed based on a steam turbine inlet steam pressure by the vacuum correction factor that is computed at the vacuum correction factor computing portion; and a gas turbine output computing portion for computing a gas turbine output by subtracting the steam turbine output that is. computed at the steam turbine output computing portion from a generator output. Control of the output of the gas turbine is done based on the gas turbine output computed at the gas turbine output computing portion.

SUMMARY OF THE INVENTION

The present invention is made with an object to provide a gas turbine control apparatus and gas turbine output computing method for a single-shaft type combined cycle power plant by which a gas turbine output can be accurately computed, while a condenser is being washed by what is called a circulating water reversing wash operation where the flow of circulating water or cooling water is switched over for a back wash and ordinary wash of the condenser.

In the course of researches and developments done by the inventors here, such fact as mentioned below has been found.

That is, while the condenser is being washed by the circulating water reversing wash operation, heat exchange action in the condenser is reduced and so the condenser vacuum is also reduced. In the conventional art as mentioned above, no consideration has been paid for the reduction in the condenser vacuum at the time of the circulating water reversing wash operation and so, in the circulating water reversing wash operation time, such a phenomenon occurs that, while the generator output is largely reduced, the steam turbine output is little reduced. Thus, it was found that the gas turbine output, that is computed by subtracting the steam turbine output from the generator output, is miscomputed as if the gas turbine output were reduced. It was also found that an output control of the gas turbine, such as a fuel control, is done based on the miscomputed gas turbine output and there is a possibility that an operation error may arise in the various components and equipments in the power plant.

Based on the result of the mentioned researches and developments, the present invention provides a gas turbine control apparatus for a single-shaft type combined cycle power plant, the single-shaft type combined cycle power plant comprising a gas turbine, steam turbine and generator, respective rotational shafts of which are connected together to form a single shaft, and a condenser for condensing exhaust steam of the steam turbine, the gas turbine control apparatus comprising a vacuum correction factor computing portion for computing a vacuum correction factor based on a condenser vacuum; a steam turbine output computing portion for computing a steam turbine output by multiplying a reference steam turbine output computed based on a steam turbine inlet steam pressure by the vacuum correction factor computed at the vacuum correction factor computing portion; and a gas turbine output computing portion for computing a gas turbine output by subtracting the steam turbine output computed at the steam turbine output computing portion from a generator output, the gas turbine control apparatus being for controlling an output of the gas turbine based on the gas turbine output computed at the gas turbine output computing portion, characterized in that the vacuum correction. factor computing portion comprises a condenser vacuum correcting portion for computing a vacuum down amount in the condenser vacuum caused by a circulating water reversing wash operation while the condenser is in the circulating water reversing wash operation and for correcting the condenser vacuum based on the vacuum down amount and the vacuum correction factor is computed based on the condenser vacuum so corrected at the condenser vacuum correcting portion.

In the gas turbine control apparatus for the single-shaft type combined cycle power plant of the present invention, the vacuum correction factor computing portion comprises the condenser vacuum correcting portion for computing the vacuum down amount in the condenser vacuum caused by the circulating water reversing wash operation while the condenser is in the circulating water reversing wash operation and for correcting the condenser vacuum based on the vacuum down amount and the vacuum correction factor is computed based on the condenser vacuum so corrected at the condenser vacuum correcting portion. Thereby, the vacuum down of the condenser vacuum is reflected in the computation of the gas turbine output at the gas turbine output computing portion. Hence, the gas turbine output can be accurately computed even at the time of the circulating water reversing wash operation. Also, the output control of the gas turbine (fuel control) is done based on the gas turbine output in which the vacuum down of the condenser vacuum is reflected and the operation error of various components and equipments due to the miscomputation of the gas turbine output, as mentioned above, can be prevented.

It is preferable that the condenser vacuum correcting portion comprises a vacuum down amount computing portion for computing the vacuum down amount based on the generator output immediately before the circulating water reversing wash operation. By the condenser vacuum correcting portion so comprising the vacuum down amount computing portion and the vacuum down amount being so computed based on the generator output immediately before the circulating water reversing wash operation, the vacuum down amount can be appropriately computed.

It is preferable that the condenser vacuum correcting portion further comprises a valve opening correction factor computing portion for computing a valve opening correction factor based on a condenser reversing valve opening and the vacuum down amount is corrected based on the valve opening correction factor computed at the valve opening correction factor computing portion. By the condenser vacuum correcting portion so further comprising the valve opening correction factor computing portion and the vacuum down amount being so corrected by the valve opening correction factor computed based on the condenser reversing valve opening, the condenser vacuum that is affected by the opening of the condenser reversing valve can be computed more appropriately.

It is preferable that the condenser vacuum correcting portion further comprises a circulating water temperature correction factor computing portion for computing a circulating water temperature correction factor based on a temperature of circulating water supplied into the condenser and the vacuum down amount is corrected based on the circulating water temperature correction. factor computed at the circulating water temperature correction factor computing portion. By the condenser vacuum correcting portion so further comprising the circulating water temperature correction factor computing portion and the vacuum down amount being so corrected by the circulating water temperature correction factor computed based on the temperature of the circulating water supplied into the condenser, the condenser vacuum that is affected by the temperature of the circulating water as cooling medium of the condenser can be computed further appropriately.

It is preferable that an angle of a compressor inlet guide vane is controlled based on the gas turbine output computed at the gas turbine output computing portion. In this case, an optimal control of the angle of the compressor inlet guide vane becomes possible and a partial load efficiency of the single-shaft type combined cycle power plant can be enhanced.

It is preferable that an opening of a combustor by-pass valve is controlled based on the gas turbine output computed at the gas turbine output computing portion. In this case, control of the opening of the combustor by-pass valve becomes stable to suppress an occurrence of a misfire and reliability of the gas turbine can be enhanced.

Also, the present invention provides a gas turbine output computing method for a single-shaft type combined cycle power plant, the single-shaft type combined cycle power plant comprising a gas turbine, steam turbine and generator, respective rotational shafts of which are connected together to form a single shaft, and a condenser for condensing exhaust steam of the steam turbine, the gas turbine output computing method comprising steps of computing a vacuum correction factor based on a condenser vacuum; computing a steam turbine output by multiplying a reference steam turbine output computed based on a steam turbine inlet steam pressure by the vacuum correction factor; and computing a gas turbine output by subtracting the steam turbine output from a generator output, characterized in further comprising steps of computing a vacuum down amount in the condenser vacuum caused by a circulating water reversing wash operation while the condenser is in the circulating water reversing wash operation; and correcting the condenser vacuum based on the vacuum down amount and computing the vacuum correction factor based on the condenser vacuum so corrected.

In the gas turbine output computing method for the single-shaft type combined cycle power plant of the present invention, the vacuum down amount in the condenser vacuum caused by the circulating water reversing wash operation while the condenser is in the circulating water reversing wash operation is computed; and the condenser vacuum is corrected based on the vacuum down amount and the vacuum correction factor is computed based on the condenser vacuum so corrected. Thereby, the vacuum down of the condenser vacuum is reflected in the gas turbine output that is computed by subtracting the steam turbine output from the generator output. Hence, the gas turbine output can be accurately computed even at the time of the circulating water reversing wash operation.

It is preferable that the vacuum down amount is computed based on the generator output immediately before the circulating water reversing wash operation. By the vacuum down amount being so computed based on the generator output immediately before the circulating water reversing wash operation, the vacuum down amount can be appropriately computed.

It is preferable that a valve opening correction factor is computed based on a condenser reversing valve opening; and the vacuum down amount is corrected based on the valve opening correction factor. By the vacuum down amount being so corrected by the valve opening correction factor computed based on the condenser reversing valve opening, the condenser vacuum that is affected by the opening of the condenser reversing valve can be computed more appropriately.

It is also preferable that a circulating water temperature correction factor is computed based on a temperature of circulating water supplied into the condenser; and the vacuum down amount is corrected based on the circulating water temperature correction factor. By the vacuum down amount being so corrected by the circulating water temperature correction factor computed based on the temperature of the circulating water supplied into the condenser, the condenser vacuum that is affected by the temperature of the circulating water as cooling medium of the condenser can be computed further appropriately.

DESCRIPTION OF THE PREFERRED EMBODIMENTS

The present invention will be described based on an embodiment according to the invention with reference to figures.

Figure 1:
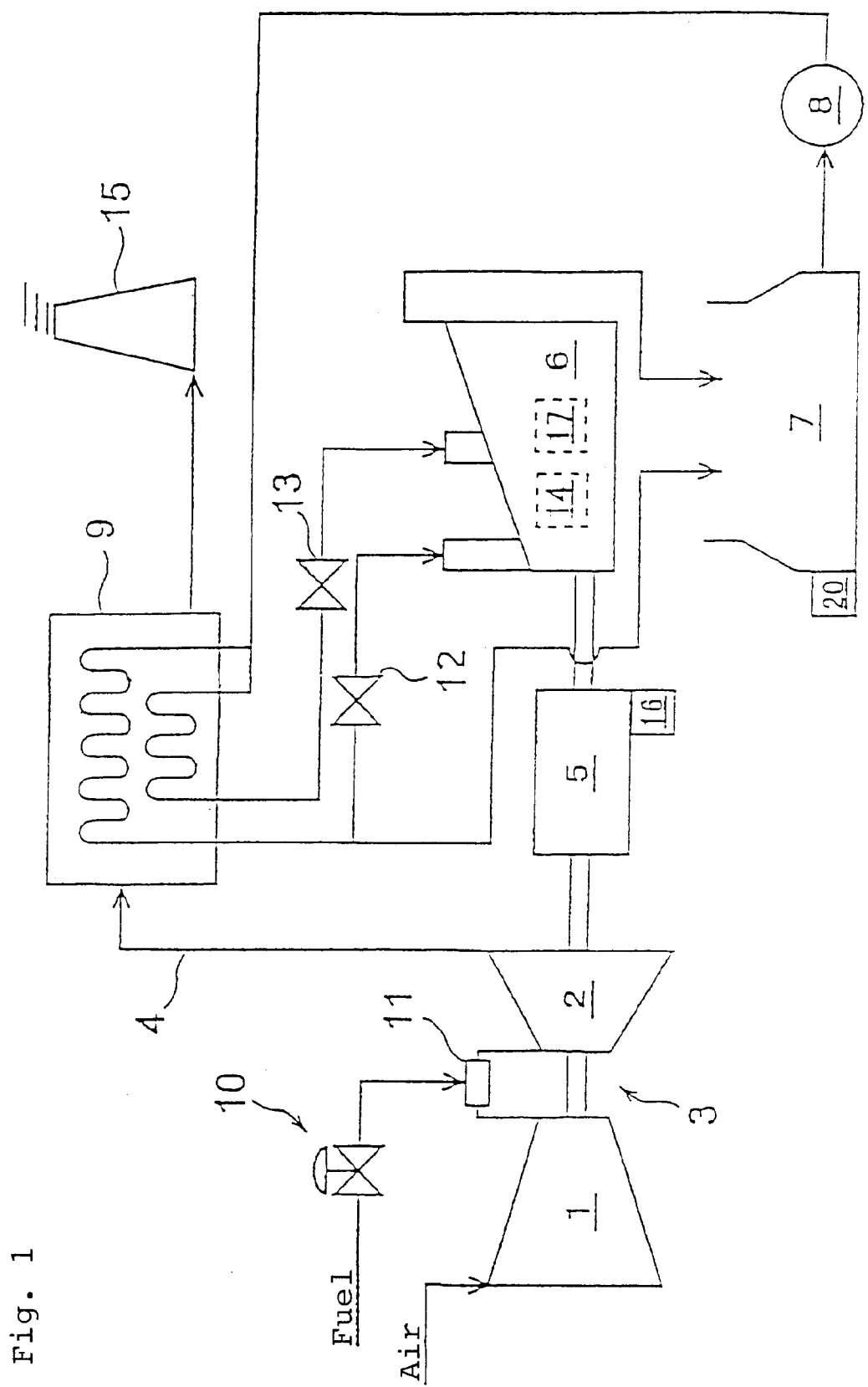
FIG. 1 is a schematic constructional view of a single-shaft type combined cycle power plant of an embodiment according to the present invention.

FIG. 1 is a schematic constructional view of a single-shaft type combined cycle power plant of the embodiment according to the present invention. This single-shaft type combined cycle power plant comprises a gas turbine 3, generator 5, steam turbine 6, condenser 7, condensate pump 8, waste heat recovery boiler 9, fuel flow regulating valve 10, combustor 11, main steam control valve 12 and steam control valve 13. The respective rotational shafts of the gas turbine 3, steam turbine 6 and generator 5 are connected together to form a single shaft so that the gas turbine 3 and the steam turbine 6, respectively, are directly connected to the single generator 5.

In the gas turbine 3, air compressed at a compressor 1 is led into the combustor 11 to be mixed with fuel of which flow rate is regulated by the fuel flow regulating valve 10 for combustion, and combustion gas generated by the combustion enters a turbine 2. Thereby, the turbine 2 and thus the generator 5 are rotated to work for generating a power. Then, the combustion gas as exhaust gas 4 is led downstream to enter the waste heat recovery boiler 9 and is discharged into the air via a stack 15. In the waste heat recovery boiler 9, heat of the exhaust gas 4 is recovered to heat feed water from the condensate pump 8 to generate a high pressure steam and low pressure steam. The high pressure steam passes through the main steam control valve 12 and the low pressure steam passes through the steam control valve 13 both to be led into the steam turbine 6. Thereby, the steam turbine 6 and thus the generator 5 are rotated for generating an electric power. The steam that has worked at the steam turbine 6 enters the condenser 7 downstream thereof to be cooled and condensed to water and this condensed water is circulated again into the waste heat recovery boiler 9 by the condensate pump 8. The steam turbine 6 is what is called a reheat turbine and, at a turbine inlet portion of reheat steam, an intercept valve 14 is provided for controlling the reheat steam.

In the ordinary operation time, an entire amount of the steam generated at the waste heat recovery boiler 9 by the exhaust gas 4 from the gas turbine 3 is led into the steam turbine 6, and both of the main steam control valve 12 and the steam control valve 13 for controlling the steam flow rate are fully opened. In this state, control of the load is mainly performed by the fuel flow regulating valve 10 that regulates a flow rate of the fuel to be supplied into the gas turbine 3. That is, the fuel flow regulating valve 10 is constructed so as to be operated by a fuel command signal to meet a deviation of the output of the generator 5 from a required output.

Figure 2:
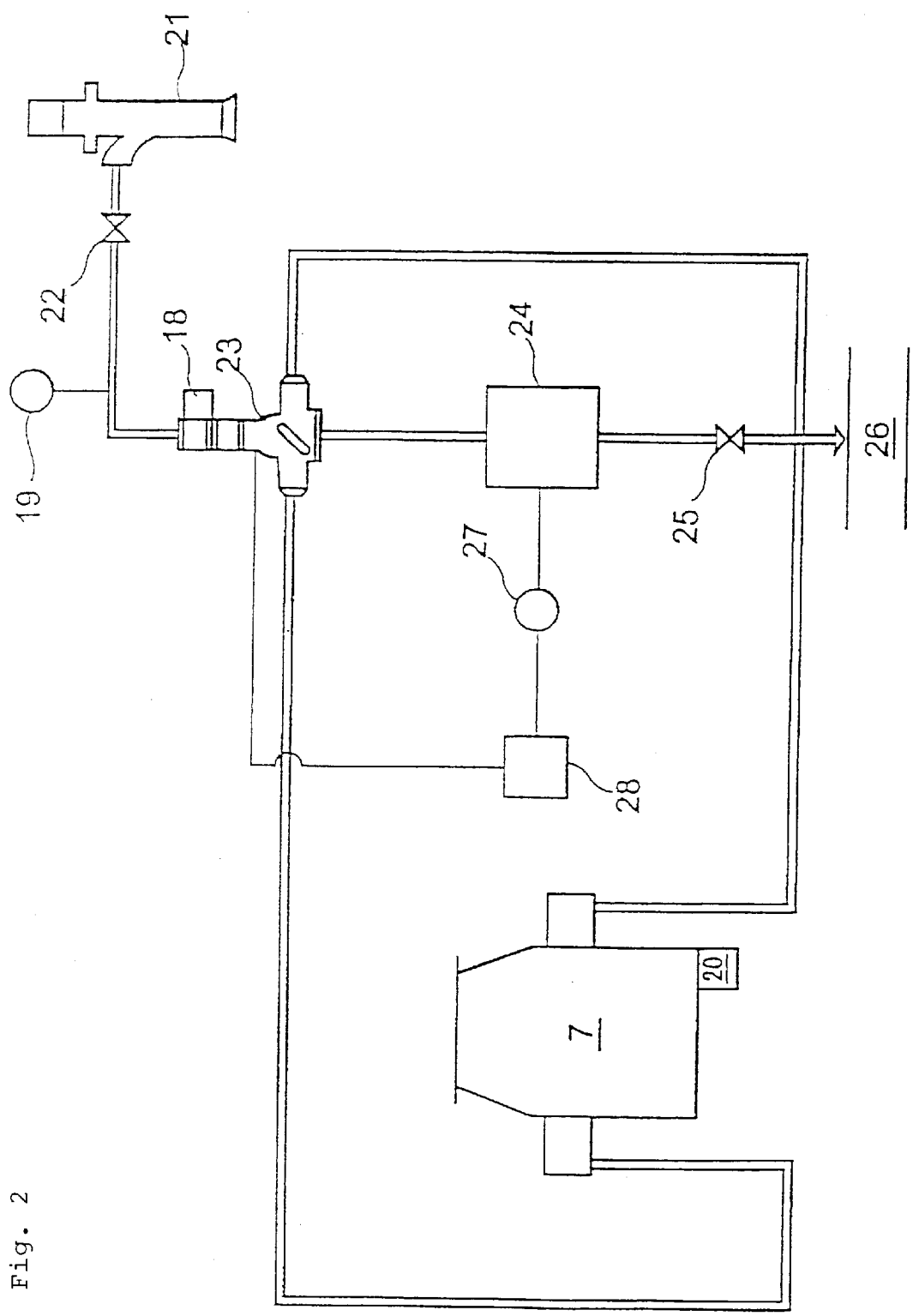
FIG. 2 is a diagram showing a condenser circulating water system included in the single-shaft type combined cycle power plant of the embodiment of FIG. 1.

FIG. 2 is a diagram of a circulating water system for the condenser 7. As circulating water or cooling water, sea water is used. In this circulating water system, sea water is first pumped up by a circulating water pump 21 to pass through a circulating water delivery valve 22, condenser reversing valve 23, etc. and is led into an inlet water chamber of the condenser 7. The sea water after used for the cooling and condensing of the steam at the condenser 7 passes through an outlet water chamber of the condenser 7 and the condenser reversing valve 23 and further passes through a ball collector 24, condenser outlet valve 25, etc. to be discharged into a a discharge channel 26. The ball collector 24 is for collecting balls used for washing condenser tubes of the condenser 7. The balls collected into the ball collector 24 is sent to a ball receiver 28 to be recovered via a ball circulating pump 27. The balls recovered into the ball receiver 28 are injected into the circulating water system upstream of the condenser reversing valve 23.

The condenser reversing valve 23 is for effecting the circulating water reversing wash operation of the condenser 7 in which the circulating water system is switched over or the flow of the circulating water in the condenser 7 is reversed to thereby perform a back wash and ordinary wash of the condenser 7. The condenser reversing valve 23 is operated so that the sea water pumped up by the circulating water pump 21 may be sent to the outlet water chamber of the condenser 7 and the opening of the valve is adjusted accordingly. Thus, in the circulating water reversing wash operation time of the condenser 7, the sea water pumped up by the circulating water pump 21 passes through the circulating water delivery valve 22, condenser reversing valve 23, etc. and is led into the outlet water chamber of the condenser 7. The sea water that has performed the back wash of the condenser 7 passes through the inlet water chamber of the condenser 7 and the condenser reversing valve 23 and further passes through the ball collector 24, condenser outlet valve 25, etc. and is discharged into the discharge channel 26.

Figure 3:
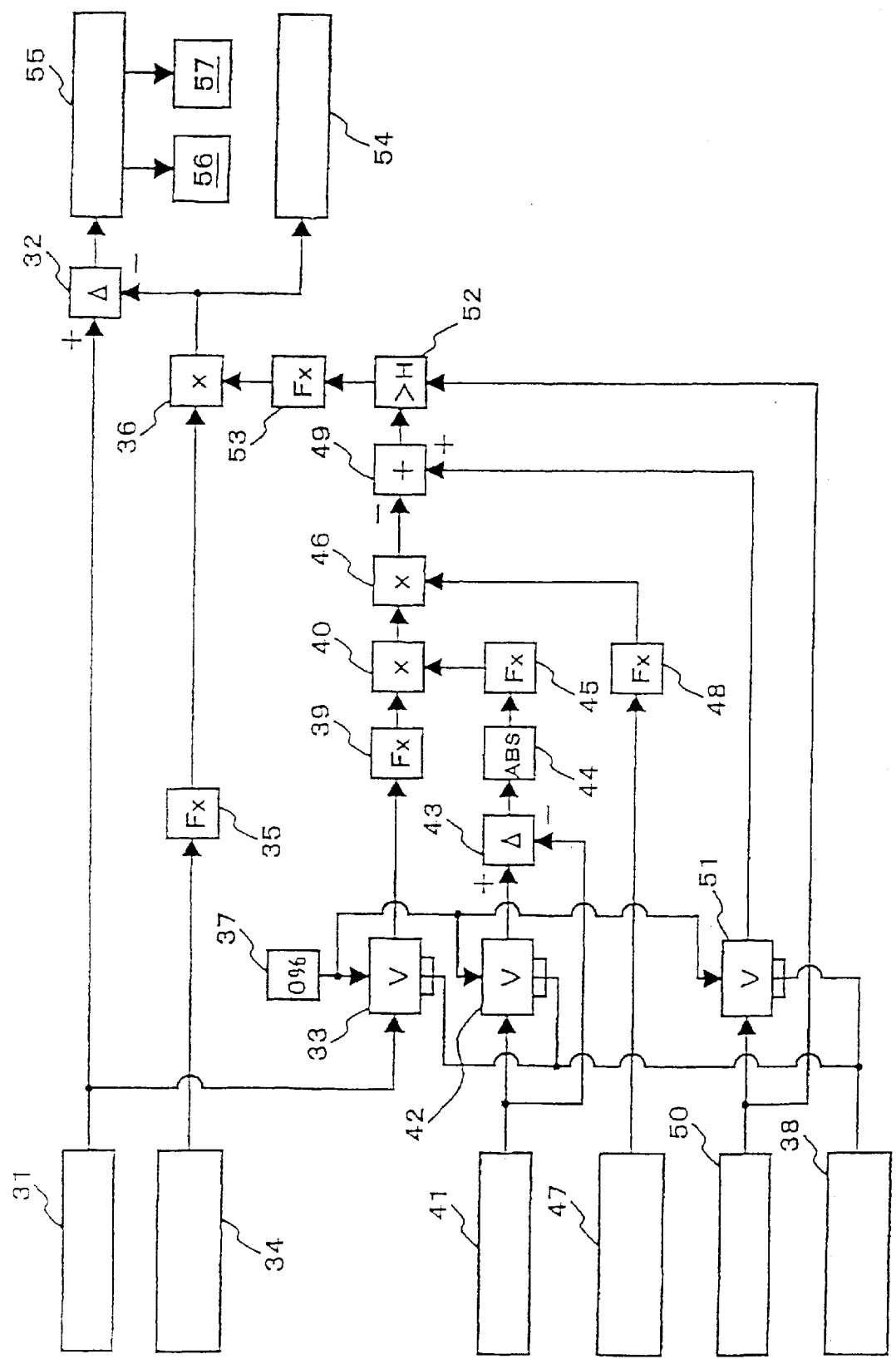
FIG. 3 is a view showing a control system for the single-shaft type combined cycle power plant of the embodiment of FIG. 1.
Figure 4:
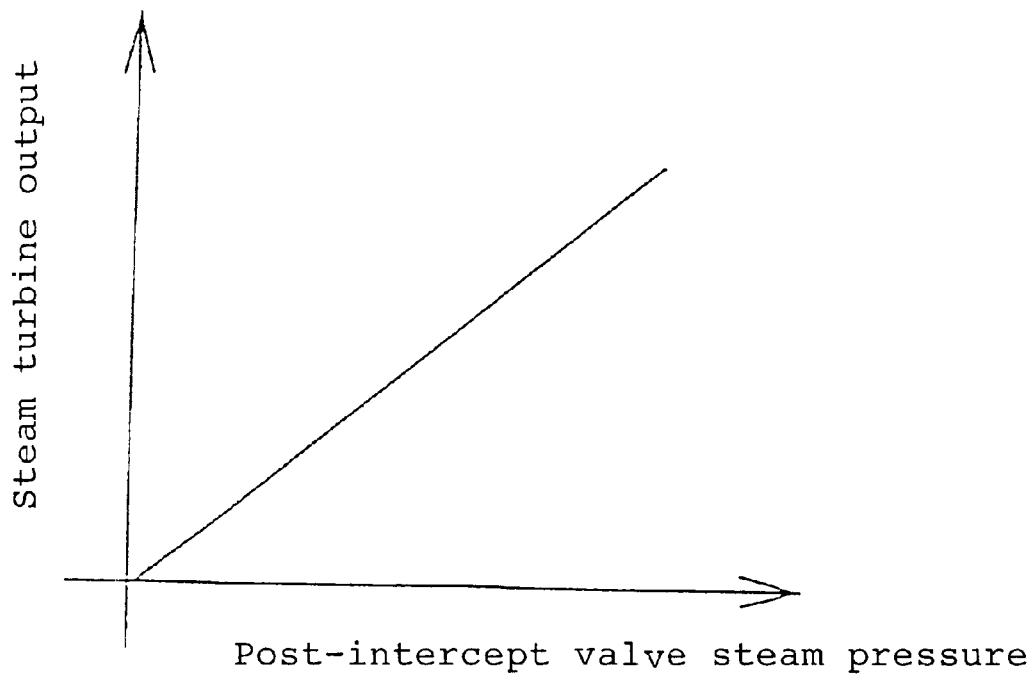
FIG. 4 is a graph showing the relation between a post-intercept valve steam pressure and a steam turbine output.

Next, with reference to FIG. 3, a control system for the single-shaft type combined cycle power plant will be described. A generator output signal 31 is put out from a generator output detecting means 16 (FIG. 1) for detecting an output of the generator 5 and is inputted into a subtracter 32 and rate-of-change limiter 33. A post-intercept valve steam pressure signal 34 is put out from a post-intercept valve steam pressure detecting means 17 (FIG. 1) for detecting a steam pressure after the intercept valve 14 as a steam turbine inlet steam pressure and is inputted into a function generator 35. The function generator 35, that is inputted with a characteristic diagram on the relation between a post-intercept valve steam pressure and a steam turbine output as shown in FIG. 4, computes a reference steam turbine output based on the relation of this characteristic diagram and puts out the reference steam turbine output so computed as an output signal into a multiplier 36. Here, the function generator 35 and multiplier 36 constitute the steam turbine output computing portion as referred to in the respective claims as appended hereto.

Figure 5:
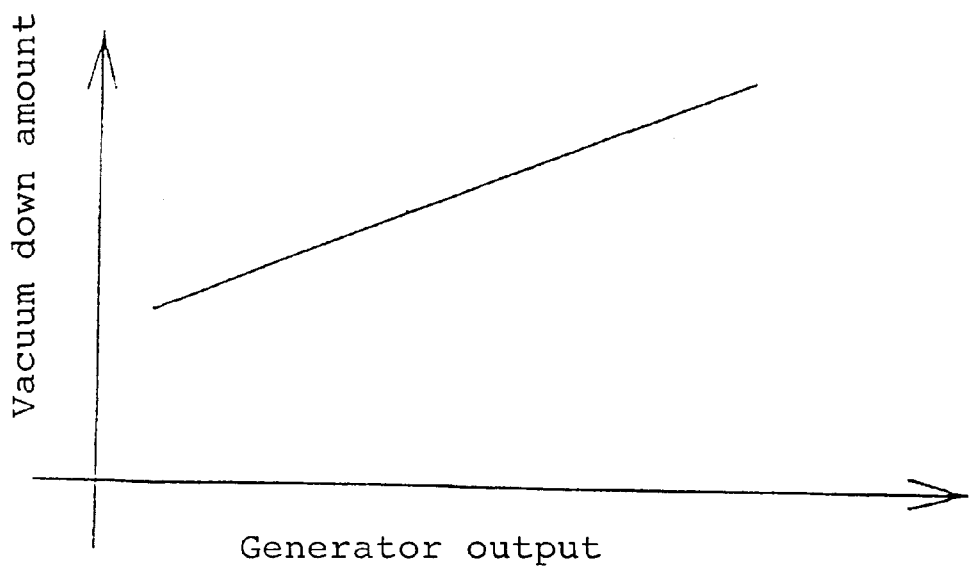
FIG. 5 is a graph showing the relation between a generator output and a vacuum down amount.

The rate-of-change limiter 33 is inputted with an output signal from a setting unit 37. This setting unit 37 is set with 0% as a rate-of-change set value for the rate-of-change limiter. Also, the rate-of-change limiter 33 is inputted with a signal 38. This signal 38 is herein defined as a signal that shows a state where the condenser 7 is not in the circulating water reversing wash operation. Thus, while the rate-of-change limiter 33 is inputted with the signal 38, the rate-of-change limiter 33 adds no rate-of-change limitation onto the generator output signal 31, so that the generator output signal 31 passes through the rate-of-change limiter 33 as it is and is put out into a function generator 39. On the other hand, while the rate-of-change limiter 33 is not inputted with the signal 38, the rate-of-change limiter 33 holds the generator output signal 31 immediately before the rate-of-change limiter 33 is inputted with the signal 38 and puts it out into the function generator 39. The function generator 39, that is inputted with a characteristic diagram on the relation between a generator output and a vacuum down amount as shown in FIG. 5, computes the vacuum down amount based on the relation of this characteristic diagram and puts out the vacuum down amount so computed as an output signal into a multiplier 40. Here, the rate-of-change limiter 33 and function generator 39 constitute the vacuum down amount computing portion as referred to in the respective claims as appended hereto.

A condenser reversing valve opening signal 41 is put out from a condenser reversing valve opening detecting means 18 (FIG. 2) for detecting an opening of the condenser reversing valve 23 and is inputted into a rate-of-change limiter 42 and subtracter 43. The rate-of-change limiter 42, like the rate-of-change limiter 33, is inputted with an output signal from the setting unit 37 and the signal 38. While the rate-of-change limiter 42 is inputted with the signal 38, the rate-of-change limiter 42 adds no rate-of-change limitation onto the condenser reversing valve opening signal 41, so that the condenser reversing valve opening signal 41 passes through the rate-of-change limiter 42 as it is and is put out into the subtracter 43. On the other hand, while the rate-of-change limiter 42 is not inputted with the signal 38, the rate-of-change limiter 42 holds the condenser reversing valve opening signal 41 immediately before the rate-of-change limiter 42 is inputted with the signal 38 and puts it out into the subtracter 43.

Figure 6:
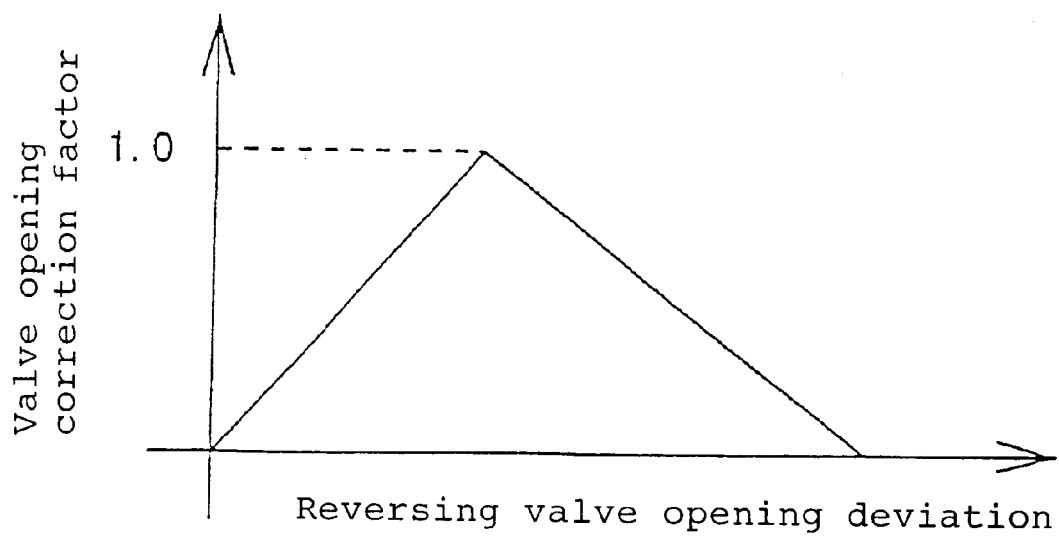
FIG. 6 is a graph showing the relation between a reversing valve opening deviation and a valve opening correction factor.

The subtracter 43 compares the current condenser reversing valve opening signal 41 and the condenser reversing valve opening signal 41 immediately before the rate-of-change limiter 42 is not inputted with the signal 38, that is put out from the rate-of-change limiter 42, and puts out the comparison result as a deviation signal into an absolute value computing portion 44. The absolute value computing portion 44 computes an absolute value of the deviation signal inputted from the subtracter 43 and puts out the computed result as an output signal into a function generator 45. The function generator 45, that is inputted with a characteristic diagram on the relation between a reversing valve opening deviation and a valve opening correction factor as shown in FIG. 6, computes the valve opening correction factor based on the relation of this characteristic diagram and puts out the valve opening correction factor so computed as an output signal into the multiplier 40. The multiplier 40 multiplies the output signal from the function generator 39 (the vacuum down amount) by the output signal from the function generator 45 (the valve opening correction factor) so as to make a correction of the vacuum down amount and puts out the corrected result into a multiplier 46. Here, the rate-of-change limiter 42, subtracter 43, absolute value computing portion 44 and function generator 45 constitute the valve opening correction factor computing portion as referred to in the respective claims as appended hereto.

Figure 7:
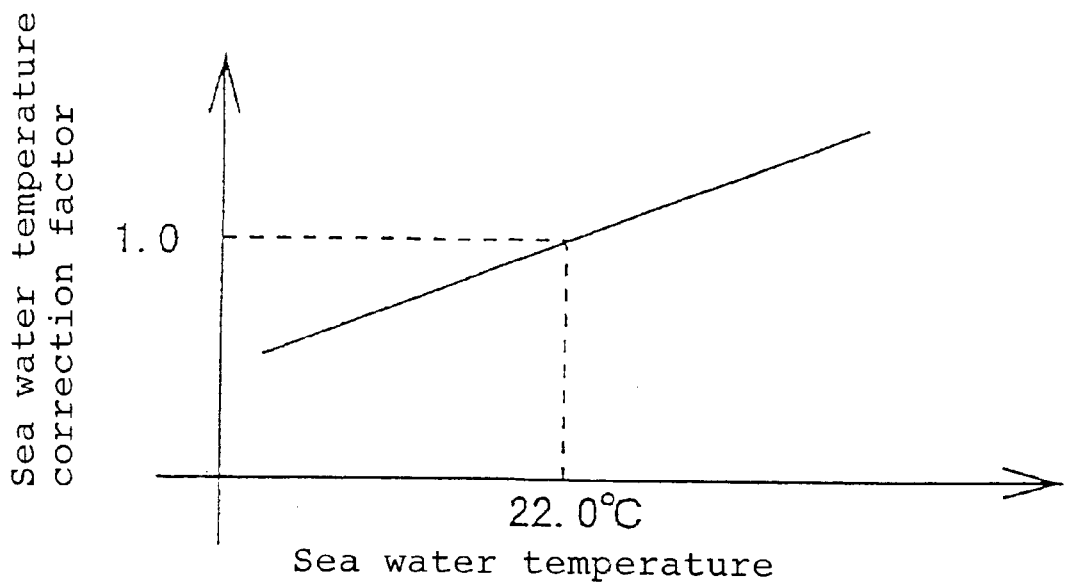
FIG. 7 is a graph showing the relation between a sea water temperature and a sea water temperature correction factor.

A condenser reversing valve inlet sea water temperature signal 47 is put out from a condenser reversing valve inlet sea water temperature detecting means 19 (FIG. 2) for detecting a temperature of the sea water as circulating water in the condenser 7 and is inputted into a function generator 48. It is to be noted that, while the reversing valve inlet sea water temperature signal 47 is used in the present embodiment, the signal is not limited thereto but may be any one that shows the temperature of the sea water as circulating water in the condenser 7. The function generator 48, that is inputted with a characteristic diagram on the relation between a sea water temperature and a sea water temperature correction factor as shown in FIG. 7, computes the sea water temperature correction factor based on the relation of this characteristic diagram and puts out the sea water temperature correction factor so computed as an output signal into the multiplier 46. The multiplier 46 multiplies the output signal from the multiplier 40 (the vacuum down amount as corrected by being multiplied by the valve opening correction factor) by the output signal from the function generator 48 (the sea water temperature correction factor) so as to make a further correction of the vacuum down amount and puts out the corrected result into an adder 49. Here, the function generator 48 constitutes the sea water temperature correction factor computing portion as referred to in the respective claims as appended hereto.

A condenser vacuum signal 50 is put out from a condenser vacuum detecting means 20 (FIGS. 1 and 2) for detecting a vacuum in the condenser 7 and is inputted into a rate-of-change limiter 51 and higher value selector 52. The rate-of-change limiter 51, like the rate-of-change limiter 33 and the rate-of-change limiter 42, is inputted with an output signal from the setting unit 37 and the signal 38. While the rate-of-change limiter 51 is inputted with the signal 38, the rate-of-change limiter 51 adds no rate-of-change limitation onto the condenser vacuum signal 50, so that the condenser vacuum signal 50 passes through the rate-of-change limiter 51 as it is and is put out into the adder 49. On the other hand, while the rate-of-change limiter 51 is not inputted with the signal 38, the rate-of-change limiter 51 selects the condenser vacuum signal 50 as well as holds the condenser vacuum signal 50 immediately before the rate-of-change limiter 51 is not inputted with the signal 38 and puts it out into the adder 49.

The adder 49 adds the output signal from the rate-of-change limiter 51 and the output signal from the multiplier 46 (the vacuum down amount as corrected by being multiplied by the valve opening correction factor and sea water temperature correction factor) and puts out the added result into the higher value selector 52. The higher value selector 52 selects the higher value signal of the condenser vacuum signal 50 and the output signal from the adder 49 (the condenser vacuum obtained by adding the condenser vacuum signal 50 immediately before the rate-of-change limiter 51 is inputted with the signal 38 and the vacuum down amount multiplied by the valve opening correction factor and sea water temperature correction factor) and puts it out into a function generator 53.

Figure 8:
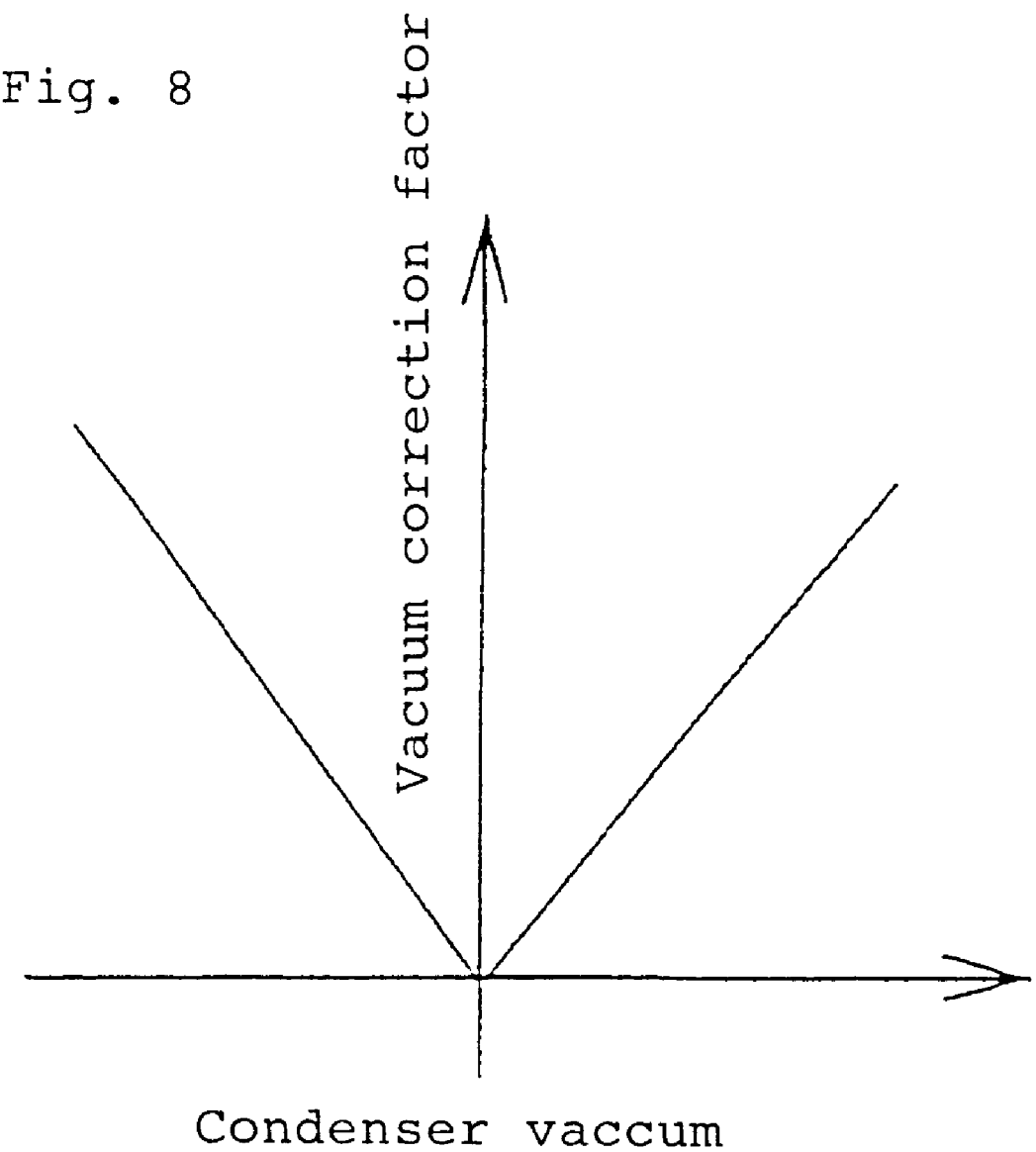
FIG. 8 is a graph showing the relation between a condenser vacuum and a vacuum correction factor.

The function generator 53, that is inputted with a characteristic diagram on the relation between a condenser vacuum and a Vacuum correction factor as shown in FIG. 8, computes the vacuum correction factor based on this characteristic diagram and puts out the vacuum correction factor so computed as an output signal into the adder 39. Here, in the present embodiment, the rate-of-change limiter 33, setting unit 37, function generator 39, multiplier 40, rate-of-change limiter 42, subtracter 43, absolute value computing portion 44, function generator 45, multiplier 46, function generator 48, adder 49, rate-of-change limiter 51, higher value selector 52 and function generator 53 constitute the vacuum correction factor computing portion as referred to in the respective claims as appended hereto.

The multiplier 36 multiplies the output signal from the function generator 35 (the reference steam turbine output) by the output signal from the function generator 53 (the vacuum correction factor) so as to make a correction of the reference steam turbine output and puts out the corrected result (the steam turbine output) as a steam turbine output signal 54 as well as sends it to the subtracter 32.

The subtracter 32 subtracts the steam turbine output signal 54 from the generator output signal 31 and puts out a gas turbine output signal 55 (the gas-turbine output). The gas turbine output signal 55 put out from the subtracter 32 is inputted into a control unit 56 for controlling an angle of a compressor inlet guide vane (IGV) and the control unit 56 controls the angle of the compressor inlet guide vane based on the gas turbine output signal 55. Also, the gas turbine output signal 55 put out from the subtracter 32 is inputted into a control unit 57 for controlling an opening of a combustor by-pass valve and the control unit 57 controls the opening of the combustor by-pass valve based on the gas turbine output signal 55. Here, the subtracter 32 constitutes the gas turbine output computing portion as referred to in the respective claims as appended hereto.

Thus, in the control system for the single-shaft type combined cycle power plant as described above, the gas turbine output is computed as follows:

The valve opening correction factor is computed based on the condenser reversing valve opening signal 41 as well as the sea water temperature correction factor is computed based on the condenser reversing valve inlet sea water temperature signal 47. The vacuum down amount computed based on the generator output signal 31 immediately before the circulating water reversing wash operation is corrected by being multiplied by the computed valve opening correction factor and sea water temperature correction factor. The vacuum down amount so corrected by the valve opening correction factor and sea water temperature correction factor is subtracted from the condenser vacuum signal 50 immediately before the circulating water reversing wash operation to thereby compute the condenser vacuum at the time of the circulating water reversing wash operation and the vacuum correction factor is computed based on the so computed condenser vacuum at the time of the circulating water reversing wash operation. The reference steam turbine output computed based on the post-intercept valve steam pressure signal 34 is multiplied by the mentioned vacuum correction factor to thereby compute the steam turbine output signal 54 and then this steam turbine output signal 54 is subtracted from the generator output signal 31 to thereby compute the gas turbine output signal 55.

As mentioned above, in the single-shaft type combined cycle power plant of the present embodiment, while the condenser 7 is in the circulating water reversing wash operation, the vacuum down amount of the condenser vacuum caused by the circulating water reversing wash operation is computed by the rate-of-change limiter 33 and function generator 39, the condenser vacuum is corrected by the multiplier 40, multiplier 46 and adder 49 based on the computed vacuum down amount and the vacuum correction factor is computed by the function generator 53 based on the corrected condenser vacuum. Thus, the vacuum down of the condenser vacuum caused by the circulating water reversing wash operation is reflected in the gas turbine output signal 55 that is computed at the subtracter 32 by subtracting the steam turbine output signal 54 from the generator output signal 31 and the gas turbine output signal 55 can be accurately computed even at the time of the circulating water reversing wash operation.

Also, as the output control of the gas turbine 3, such as adjusting the fuel air amount in the combustor 11, is done based on the gas turbine output signal 55 in which the vacuum down of the condenser is reflected, the operation error of various components and equipments due to the miscomputation of the gas turbine output signal 55 can be prevented.

Further, as the vacuum down amount is computed at the rate-of-change limiter 33 and function generator 39 based on the generator output signal 31 immediately before the circulating water reversing wash operation, the vacuum down amount due to the circulating water reversing wash operation can be appropriately computed.

Further, as the valve opening correction factor is computed at the rate-of-change limiter 42, subtracter 43, absolute value computing portion 44 and function generator 45 based on the condenser reversing valve opening signal 41 and the vacuum down amount computed at the rate-of-change limiter 33 and function generator 39 is corrected by being multiplied at the multiplier 40 by the valve opening correction factor, the condenser vacuum that is affected by the opening of the condenser reversing valve 23 can be computed more appropriately.

Further, as the sea water temperature correction factor is computed at the function generator 48 based on the condenser reversing valve inlet sea water temperature signal 47 and the vacuum down amount corrected at the multiplier 40 is further corrected by being multiplied at the multiplier 46 by the sea water temperature correction factor, the condenser vacuum that is affected by the temperature of the sea water as cooling medium of the condenser 7 can be computed further appropriately.

Also, as the gas turbine output signal 55 is put out into the control unit 56 for controlling the angle of the compressor inlet guide vane (IGV) and the control unit 56 controls the angle of the compressor inlet guide vane based on this gas turbine output signal 55, an optimal control of the angle of the compressor inlet guide vane becomes possible and a partial load efficiency of the single-shaft type combined cycle power plant can be enhanced.

Further, as the gas turbine output signal 55 is put out into the control unit 57 for controlling the opening of the combustor by-pass valve and the control unit 57 controls the opening of the combustor by-pass valve based on this gas turbine output signal 55, control of the opening of the combustor by-pass valve becomes stable to suppress an occurrence of a misfire and reliability of the gas turbine can be enhanced.

It is to be noted that, in the present embodiment, the construction is made such that the valve opening correction factor is computed at the rate-of-change limiter 42, subtracter 43, absolute value computing portion 44 and function generator 45 based on the condenser reversing valve opening signal 41 and the vacuum down amount computed at the rate-of-change limiter 33 and function generator 39 is corrected by being multiplied at the multiplier 40 by the valve opening correction factor, but the vacuum down amount is not always needed to be corrected by the valve opening correction factor.

Also, in the present embodiment, the construction is made such that the sea water temperature correction factor is computed at the function generator 48 based on the condenser reversing valve inlet sea water temperature signal 47 and the vacuum down amount corrected at the multiplier 40 is further corrected at the multiplier 46 by being multiplied by the sea water temperature correction factor, but the vacuum down amount is not always needed to be corrected by the sea water temperature correction factor.

INDUSTRIAL APPLICABILITY

As described above, according to the gas turbine control apparatus for the single-shaft type combined cycle power plant of the present invention, the vacuum correction factor computing portion comprises the condenser vacuum correcting portion for computing the vacuum down amount in the condenser vacuum caused by the circulating water reversing wash operation while the condenser is in the circulating water reversing wash operation and for correcting the condenser vacuum based on the vacuum down amount and the vacuum correction factor is computed based on the condenser vacuum so corrected at the condenser vacuum correcting portion. Thereby, the vacuum down of the condenser vacuum is reflected in the computation of the gas turbine output at the gas turbine output computing portion. Hence, the gas turbine output can be accurately computed even at the time of the circulating water reversing wash operation. Also, the output control of the gas turbine (fuel control) is done based on the gas turbine output in which the vacuum down of the condenser vacuum is reflected and the operation error of various components and equipments due to the miscomputation of the gas turbine output can be prevented.

According to the gas turbine output computing method for the single-shaft type combined cycle power plant of the present invention, the vacuum down amount in the condenser vacuum caused by the circulating water reversing wash operation while the condenser is in the circulating water reversing wash operation is computed; and the condenser vacuum is corrected based on the vacuum down amount and the vacuum correction factor is computed based on the condenser vacuum so corrected. Thereby, the vacuum down of the condenser vacuum is reflected in the gas turbine output that is computed-by subtracting the steam turbine output from the generator output. Hence, the gas turbine output can be accurately computed even at the time of the circulating water reversing wash operation.

What is claimed is:

1. A gas turbine control apparatus for a single-shaft type combined cycle power plant, the single-shaft type combined cycle power plant comprising a gas turbine, steam turbine and generator, respective rotational shafts which are connected together to form a single shaft, and a condenser for condensing exhaust steam of the steam turbine, said gas turbine control apparatus comprising:

a vacuum correction factor computing portion for computing a vacuum correction factor based on a condenser vacuum;

a steam turbine output computing portion for computing a steam turbine output by multiplying a reference steam turbine output, computed based on a steam turbine inlet steam pressure, by said vacuum correction factor computed at said vacuum correction factor computing portion; and a gas turbine output computing portion for computing a gas turbine output by subtracting said steam turbine output computed at said steam turbine output computing portion from a generator output;

wherein said gas turbine control apparatus is for controlling an output of said gas turbine based on said gas turbine output computed at said gas turbine output computing portion; and wherein said vacuum correction factor computing portion comprises a condenser vacuum correcting portion for computing a vacuum down amount in said condenser vacuum caused by a circulating water reversing wash operation while said condenser undergoes the circulating water reversing wash operation and for correcting said condenser vacuum based on said vacuum down amount, and said vacuum correction factor is computed based on said condenser vacuum as corrected at said condenser vacuum correcting portion.

2. A gas turbine control apparatus for a single-shaft type combined cycle power plant as claimed in claim 1, wherein said condenser vacuum correcting portion comprises a vacuum down amount computing portion for computing said vacuum down amount based on the generator output immediately before said circulating water reversing wash operation.

3. A gas turbine control apparatus for a single-shaft type combined cycle power plant as claimed in claim 2, wherein said condenser vacuum correcting portion further comprises a valve opening correction factor computing portion for computing a valve opening correction factor based on a condenser reversing valve opening and said vacuum down amount is corrected based on said valve opening correction factor computed at said valve opening correction factor computing portion.

4. A gas turbine control apparatus for a single-shaft type combined cycle power plant as claimed in claim 3, wherein said condenser vacuum correcting portion further comprises a circulating water temperature correction factor computing portion for computing a circulating water temperature correction factor based on a temperature of circulating water supplied into said condenser and said vacuum down amount is corrected based on said circulating water temperature correction factor computed at said circulating water temperature correction factor computing portion.

5. A gas turbine control apparatus for a single-shaft type combined cycle power plant as claimed in claim 4, wherein an angle of a compressor inlet guide vane is controlled based on said gas turbine output computed at said gas turbine output computing portion.

6. A gas turbine control apparatus for a single-shaft type combined cycle power plant as claimed in claim 5, wherein an opening of a combustor by-pass valve is controlled based on said gas turbine output computed at said gas turbine output computing portion.

7. A gas turbine control apparatus for a single-shaft type combined cycle power plant as claimed in claim 4, wherein an opening of a combustor by-pass valve is controlled based on said gas turbine output computed at said gas turbine output computing portion.

8. A gas turbine control apparatus for a single-shaft type combined cycle power plant as claimed in claim 3, wherein an angle of a compressor inlet guide vane is controlled based on said gas turbine output computed at said gas turbine output computing portion.

9. A gas turbine control apparatus for a single-shaft type combined cycle power plant as claimed in claim 8, wherein an opening of a combustor by-pass valve is controlled based on said gas turbine output computed at said gas turbine output computing portion.

10. A gas turbine control apparatus for a single-shaft type combined cycle power plant as claimed in claim 2, wherein said condenser vacuum correcting portion further comprises a circulating water temperature correction factor computing portion for computing a circulating water temperature correction factor based on a temperature of circulating water supplied into said condenser and said vacuum down amount is corrected based on said circulating water temperature correction factor computed at said circulating water temperature correction factor computing portion.

11. A gas turbine control apparatus for a single-shaft type combined cycle power plant as claimed in claim 10, wherein an angle of a compressor inlet guide vane is controlled based on said gas turbine output computed at said gas turbine output computing portion.

12. A gas turbine control apparatus for a single-shaft type combined cycle power plant as claimed in claim 2, wherein an angle of a compressor inlet guide vane is controlled based on said gas turbine output computed at said gas turbine output computing portion.

13. A gas turbine control apparatus for a single-shaft type combined cycle power plant as claimed in claim 12, wherein an opening of a combustor by-pass valve is controlled based on said gas turbine output computed at said gas turbine output computing portion.

14. A gas turbine control apparatus for a single-shaft type combined cycle power plant as claimed in claim 1, wherein an angle of a compressor inlet guide vane is controlled based on said gas turbine output computed at said gas turbine output computing portion.

15. A gas turbine control apparatus for a single-shaft type combined cycle power plant as claimed in claim 1, wherein an opening of a combustor by-pass valve is controlled based on said gas turbine output computed at said gas turbine output computing portion.

16. A gas turbine output computing method for a single-shaft type combined cycle power plant, the single-shaft type combined cycle power plant comprising a gas turbine, steam turbine and generator, respective rotational shafts which are connected together to form a single shaft, and a condenser for condensing exhaust steam of the steam turbine, said gas turbine output computing method comprising:

computing a vacuum correction factor based on a condenser vacuum;

computing a steam turbine output by multiplying a reference steam turbine output, computed based on a steam turbine inlet steam pressure, by said vacuum correction factor; and computing a gas turbine output by subtracting said steam turbine output from a generator output;

wherein said computing of a vacuum correction factor comprises:

computing a vacuum down amount of the condenser vacuum caused by a circulating water reversing wash operation while the condenser undergoes the circulating water reversing wash operation; and correcting the condenser vacuum based on the vacuum down amount and computing the vacuum correction factor based on the condenser vacuum so corrected.

17. A gas turbine output computing method for a single-shaft type combined cycle power plant as claimed in claim 16, comprising computing the vacuum down amount based on the generator output immediately before the circulating water reversing wash operation.

18. A gas turbine output computing method for a single-shaft type combined cycle power plant as claimed in claim 17, comprising:

computing a valve opening correction factor based on a condenser reversing valve opening; and correcting the vacuum down amount based on the valve opening correction factor.

19. A gas turbine output computing method for a single-shaft type combined cycle power plant as claimed in claim 18, comprising:

computing a circulating water temperature correction factor based on a temperature of circulating water supplied into the condenser; and correcting the vacuum down amount based on the circulating water temperature correction factor.

20. A gas turbine output computing method for a single-shaft type combined cycle power plant as claimed in claim 17, comprising:

computing a circulating water temperature correction factor based on a temperature of circulating water supplied into the condenser; and correcting said vacuum down amount based on said circulating water temperature correction factor.

* * * * *